United States Patent [19]

White

[11] 4,077,950

[45] Mar. 7, 1978

[54] PROCESS FOR THE RECOVERY OF SUBSTANTIALLY WATER-SOLUBLE NON-TOXIC PROTEIN COMPOUNDS FROM FRESH NON-WOODY VEGETATION

[75] Inventor: Robert Wickey White, New York, N.Y.

[73] Assignee: Source Proteins, Inc., Ossining, N.Y.

[21] Appl. No.: 704,118

[22] Filed: Jul. 12, 1976

[51] Int. Cl.$^2$ ............................................. A23J 1/14
[52] U.S. Cl. ................................................ 260/112 R
[58] Field of Search ..................................... 260/112 R

[56] References Cited

U.S. PATENT DOCUMENTS

| | | | |
|---|---|---|---|
| 3,090,779 | 5/1963 | Chayen | 260/112 R |
| 3,637,396 | 1/1971 | Hollo et al. | 260/112 R X |
| 3,728,326 | 4/1973 | Putter | 260/112 R X |
| 3,823,128 | 7/1974 | Bickoff et al. | 260/112 R |
| 3,888,839 | 6/1975 | Newell et al. | 260/112 R |

*Primary Examiner*—Walter C. Danison
*Attorney, Agent, or Firm*—Kenyon & Kenyon, Reilly, Carr & Chapin

[57] ABSTRACT

Disclosed herein is a novel process for the extraction of protein compounds from fresh, non-woody vegetation or plant material such as algae, nuts, leaves and yeasts, wherein the plant material is moisturized, comminuted, and expressed to obtain a plant juice which is then acidulated to precipitate a protein complex. The complex is then de-watered and contacted with non-polar and polar organic solvents.

1 Claim, No Drawings

PROCESS FOR THE RECOVERY OF SUBSTANTIALLY WATER-SOLUBLE NON-TOXIC PROTEIN COMPOUNDS FROM FRESH NON-WOODY VEGETATION

BACKGROUND OF THE INVENTION

This invention relates to protein compounds, and more particularly, to the recovery of water-soluble protein compounds from fresh vegetation or plant material.

It has long been recognized that the plant world is the largest source of proteins available to us, but heretofore consumption of this plant protein has been severely limited in human nutrition because it is generally not available in forms consonant with human digestion.

Furthermore, it being known that many plants produce toxic substances within themselves, it has not been possible to rely on processing of plants in known ways so as to assure their safe consumption for human beings.

This lack of secure purity in plant materials has had an inhibiting effect on the use of plant-derived proteins in human nutrition. It is clear that a process which renders such sources substantially harmless would be extremely beneficial.

Heretofore the arts by which proteins in plants have generally been produced render the final product substantially insoluble in water. The lack of this solubility has made it difficult to introduce extracted plant proteins into human diets.

Accordingly, it is an object of this invention to recover a substantially water-soluble protein product from plant materials.

Another object is to recover a substantially water-soluble, non-toxic protein product from fresh plant material.

Yet another object is to recover a substantially water-soluble, non-toxic protein product from alfalfa.

Still another object is to recover a substantially flavorless protein product from fresh leafy plant materials.

Another object is to more efficiently extract proteins materials by feeding back process liquors into the initial phase of the process flow as described herein.

Another object is to more efficiently de-flavor the protein compounds produced by this process by means of polar solvent extraction by counterflow methods following prior extraction as described herein.

SUMMARY OF THE INVENTION

The foregoing objects are accomplished by a process comprising the steps of:

a. contacting plant material with an aqueous alkaline medium in an amount sufficient to increase the moisture content thereof to 80% or more and to increase the pH thereof to at least about 8.0;

b. rupturing substantially all cell walls in the plant material;

c. recovering an aqueous protein-containing fraction from said material of the previous step;

d. acidulating the aqueous protein-containing fraction with an inorganic acid in sufficient quantity and strength as to cause protein compounds in the liquid to be precipitated therefrom as the pH of the isoelectric point of the protein compounds is reached;

e. removing a substantial portion of the liquid from which proteinaceous compounds have been precipitated by the preceding step to isolate a precipitated protein complex;

f. mixing said precipitated protein complex with sufficient non-miscible volatile organic hydrocarbon solvent to extract from said liquid substantially all compounds dissolvable in said solvent from the liquid;

g. heating said mixture of volatile solvent and precipitated protein complex so as to expel substantially all the water therefrom; and h. contacting the resulting substantially water-free protein compounds with an organic alcohol to extract alcohol soluble components therefrom, resulting in the isolation of a substantially water-soluble, non-toxic protein product.

In a more specific embodiment of this invention, the liquid removed in step e may be recycled for use in step a. Typically, the removed liquid of e is first alkalinized prior to its use in the initial contacting step a.

The foregoing process is applicable to a wide range of plant materials such as algae, nuts, leaves, and yeasts. In a preferred embodiment, alfalfa is utilized as a source material.

DETAILED DESCRIPTION OF THE INVENTION

Typically the plant is cut and woody or tuberous parts, if any, are removed. The remaining material, which typically includes all chlorophyll producing parts of the plant, is wetted with an aqueous ammonia solution to which has been added a small quantity of sodium bisulfite. The object of this step is to increase the water content of the plant material to about 80% and to increase the pH to about 8. This procedure renders proteinaceous materials in the plants more soluble in the aqueous medium.

Thereafter the material is finely comminuted by any means such as grinding, shredding, abrading, or other similar means. The desired object of this step is to obtain the rupture of as many cell walls as possible, however this may be accomplished. Thus, this step is not limited to the above mechanical means but may be accomplished by ultrasonic vibration, cation exchange, reverse osmosis, or the production of a severe pressure gradient between the inside and outside of the cell walls by any other means, such as suddenly pressurizing and depressurizing the material in rapid succession. It is important in this step that temperatures do not exceed about 50° C, at this prevents degradation of the protein compounds contained therein. With this one limitation, any means may be used to accomplish the step of freeing as much of the plant juice as possible from the containing cell walls.

Next the plant juice must be expressed from the plants. This may be acheived by centrifuge, by filter press, twin-screw press, pressure chamber or by any other means which will accomplish this object without raising the temperature of the material above 50° C. and without undue slowness, it being important to accomplish the above steps as quickly as possible for the purpose of maximizing juice extraction and minimizing coagulation thereof.

The press cake obtained from this process will vary in quality with the means employed to produce it and the nature of the starting materials employed to make it. Typically, it will contain about half the original protein of the plant, although this will vary from species to species, and depending on the toxicity of the original plant may be used as feed silage, hayage or fertilizer, or as a substrate for yeast production.

The expressed plant juice is then conveyed to a tank or vat or other vessel where it it contacted with an inorganic acid in sufficient quantity and strength to lower the pH to the iso-electric point of the protein contained in it, usually between 2.5 and 5 pH, depending on the source of the material. This has the effect of precipitating a protein-lipid complex in the liquid.

This precipitate may then be substantially de-watered by removing up to 60–70 percent of the water contained therein by mechanical or other means which may accomplish this operation at ambient temperatures. Such means include, but are not limited to, centrifugation, filtration, decantation or other density separation techniques.

The liquid so removed is returned to the cycle by being pumped or otherwise conveyed to the washing and pumping cycle as mentioned above, after first being treated with ammonia and sodium bisulfite.

The de-watered precipitate is then conveyed to a vessel wherein it is contacted with a non-polar, non-water-miscible volatile solvent in sufficient quantity to extract from the precipitate all compounds contained therein which are soluble in this type of solvent. Such solvents include, but are not limited to, hexane, benzene, heptane and other similar chemicals.

Such solvents have two properties which are of value in the extraction. In the first instance, they extract certain oilborne toxins which may be in the starting material of the process. Secondly, it makes it possible to substantially de-water the compounds through azeotropic drying. This drying process may be carried out at a temperature considerably less than that of the boiling point of the water alone, thus guarding against unnecessary degradation of the proteins contained therein. It is furthermore a property of the use of such solvents that they do not contribute, even in the azeotropic drying process, to the irreversible coagulation of a lipid-protein complex, but rather hold these components of the plant juice in very loose association with each other. This is a crucial consideration inasmuch as the coagulation of a lipid-protein complex is irreversible.

The non-miscible solvent may now be removed from the precipitated materials. It is contemplated that this be done by mechanical means such as filtration or centrfugation, although not limited to such means. A method which has been found useful is to gently warm the solvent contacted compounds in a partial vacuum, which assists the evaporation of the solvent at a lower temperature than at ordinary atmospheric pressures.

The resulting material is now immediately contacted with a polar solvent such as ethanol, methanol or isopropanol. Since the material had been de-watered up to as much as ninety percent by the aforementioned azeotropic drying process, it is important to effect this contact with polar solvents as quickly as possible to prevent complexing of the lipid-protein mixture.

It has been found desirable and effective to contact this material with this solvent in a counter-flow mode, inasmuch as this permits more efficient use of the solvents involved. The de-watering process mentioned above, as well as the use of the counterflow methods in further cleaning the protein material, allows the use of much less solvent that if it were added to the material when it is in an aqueous medium of high proportion. Furthermore, the contact time is greatly reduced through the use of counterflow techniques. No attempt is made herein to specify the nature of these techniques, inasmuch as they may be achieved by several methods of continuous nature for which there is no contemplated optimum. Centrifuges, sluice boxes, troughs or other means are intended to be embraced by the meaning of counterflow, it being sufficient to add the qualifications to those skilled in the arts that it is better to have a continuous contacting of the material rather than a zonal or non-continuous contacting of the material by the solvent.

The purpose of the use of polar solvents is to reclaim from the starting materials chlorophylls, caretenoids, xanthophylls and other compounds which flavor, color or otherwise impurify the desired proteinaceous material to be extracted.

Next, the solvent is removed from contact with the material. This removal is typically mechanical, for economic reasons, but is not limited to such means as centrifugation, filtration or decantation. The solvent, containing perhaps ten percent water and the dissolved components mentioned above, is then purified by distillation, typically by heating in the presence of a partial vacuum, and returned to the process cycle. The dissolved substances may then be completely dried and pelletized and used as a source of the valuable compounds contained therein.

The remaining solids in the underflow of the solvent removal process constitute a singularly pure, bland, tannish source of valuable protein compounds. The amino acid content, is limited primarily by the source of the starting material, but is fundamentally non-toxic. Because the procedure has been carried out at largely ambient temperatures the typically crusted appearance and characteristic of plant protein compounds produced by other methods is not produced by this art disclosed herein. Hence the object of this invention, to produce a substantially water-soluble, non-toxic protein material from leafy plant materials has been achieved.

This final product may be dried gently in the presence of a partial vacuum, or it maybe preserved in a pasty condition through any known means of preservation including but not limited to, inoculation, salting, pickling with antibiotics, antioxidants, two-step pasteurization at approximately 60° C., saturation with oils or sugars, or any other means to inhibit the growth of pathogens.

It may be further noted that, as the process described herein calls for a relatively low temperature throughout, high microsomal nuclease activity and nucleic acid degradation occur, resulting in a product that is low in nucleic acid levels, and therefore of higher benefit in nutrition for human beings.

Although the invention herein has been described with reference to certain preferred conditions and materials, they are intended to be merely illustrative, the scope of the invention being defined in the appended claims.

What is claimed is:

1. A process for treating alfalfa to recover a substantially water-soluble, non-toxic protein product, comprising the steps of:
   (a) contacting said alfalfa with an aqueous alkaline medium containing sodium bisulfite in an amount sufficient to increase the moisture content thereof to at least about 80% by weight and to increase the pH thereof to at least about 8.0;
   (b) mechanically comminuting the moisturized and alkalinized alfalfa in a manner which prevents said alfalfa from reaching a temperature above about 50° C;

(c) mechanically expressing said comminuted alfalfa in a manner which prevents said alfalfa from reaching a temperature above about 50° C, to obtain an aqueous protein-containing fraction therefrom;

(d) acidulating said protein-containing fraction to a pH of from about 2.5 to about 5 to precipitate a water-containing protein-lipid complex;

(e) mechanically removing from about 60 to about 70% of the water from said water-containing protein-lipid complex at ambient temperature;

(f) contacting said protein-lipid complex with a nonpolar, water immiscible volatile organic solvent to extract from said precipitate lipids and other compounds soluble in said solvent;

(g) heating said mixture of volatile solvent and protein complex so as to expel substantially all the water therefrom at a temperature below the boiling point of water;

(h) removing said volatile solvent from the remaining substantially water-free protein complex at a temperature below about 80° C;

(i) countercurrently extracting said protein complex with polar organic alcohol to isolate a substantially water-soluble, non-toxic protein product;

(j) recovering alcohol soluble compounds from said alcohol and recycling the alcohol to said countercurrent extraction stage; and (k) alkalinizing the water removed in step (e) and recycling said water to the contact of alfalfa in step (a).

* * * * *